(No Model.)
E. K. HOLTON.
SHOVEL HANDLE.
No. 321,028. Patented June 30, 1885.
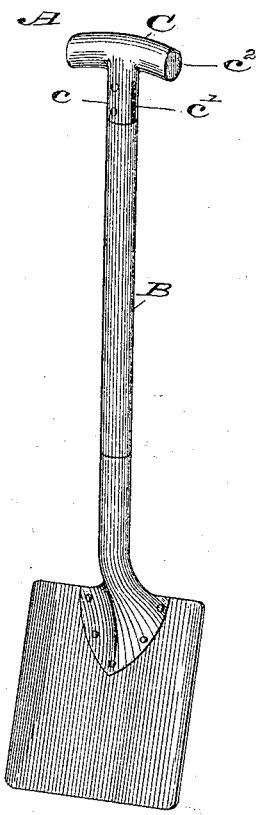
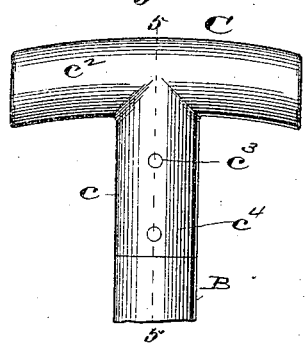
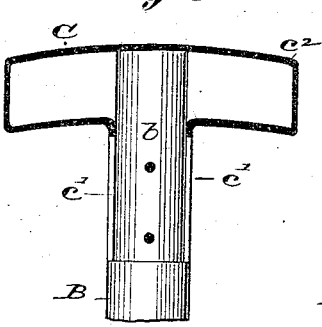
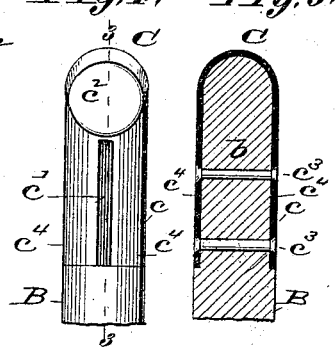
Attest:
Charles Pickles
J. W. Hoke.
Inventor:
Edward K. Holton
by C. D. Moody
atty

UNITED STATES PATENT OFFICE.

EDWARD K. HOLTON, OF WEBSTER GROVE, ASSIGNOR TO ST. LOUIS SHOVEL COMPANY, OF ST. LOUIS, MISSOURI.

SHOVEL-HANDLE.

SPECIFICATION forming part of Letters Patent No. 321,028, dated June 30, 1885.

Application filed February 14, 1885. (No model.)

*To all whom it may concern:*

Be it known that I, EDWARD K. HOLTON, of Webster Grove, St. Louis county, Missouri, have made a new and useful Improvement in Shovel-Handles, of which the following is a full, clear, and exact description.

The improvement relates to shovels having a metallic handle; and it consists in the manner of constructing the handle so that in attaching it its socket can be contracted upon the stock of the shovel.

The annexed drawings, making part of this specification, illustrate the improvement.

Figure 1 is a view in perspective of a shovel having the improved handle; and Figs. 2, 3, 4, and 5 are views upon an enlarged scale of that portion of the shovel to which the improvement immediately relates, Fig. 2 being a side elevation of the handle and the upper end of the stock, Fig. 3 a section on the line 3 3 of Fig. 4, Fig. 4 an elevation at right angles to that of Fig. 2, and Fig. 5 a section on the line 5 5 of Fig. 2.

The same letters of reference denote the same parts.

A, Fig. 1, represents a shovel of a familiar type, saving as it is modified by the improvement in question.

B represents the stock, and C represents the handle.

The handle is of malleable iron, is T-shaped in side elevation, and is hollow, and it is attached to the stock B by inserting the end $b$ of the stock in the socket $c$ of the handle. The especial feature, however, of the handle is making the socket contractible, so that in attaching the handle the socket can be tightened upon the stock, and both when the handle is originally attached, and also subsequently, in case the stock from shrinkage becomes loose within the socket. To this end the socket is slit longitudinally at $c'$ $c'$ at opposite sides of the socket, the slits extending from the lower end of the socket well upward to the cross-bar $c^2$ of the handle. After the stock has been inserted it is secured in the socket by means of the rivets $c^3$ $c^3$, which also serve to draw the free ends $c^4$ $c^4$ of the socket toward each other, and thereby to contract the socket upon the stock. The material named—malleable iron—for the manufacture of the handle is considered the most desirable therefor. A strong durable handle well suited for tamping is obtained, and at less expense than that of the D-shaped tamping-handle. The handle can be cast hollow and in a single piece. The ends of the cross-bar $c^2$ are preferably closed. It also permits of the socket ends $c^4$ $c^4$ being tightened upon the stock. So far as this contractible feature of the socket is concerned, it is immaterial whether the handle in outline is T-shaped or otherwise.

I claim—

As a new manufacture, the hollow T-shaped handle C, having the socket $c$, slit at $c'$ $c'$, substantially as described.

EDWARD K. HOLTON.

Witnesses:
C. D. MOODY,
J. W. HOKE.